United States Patent
Kest

(10) Patent No.: US 10,380,627 B2
(45) Date of Patent: Aug. 13, 2019

(54) IDENTIFICATION OF SOFTWARE ROBOT ACTIVITY

(71) Applicant: Kenshoo Ltd., Tel Aviv (IL)

(72) Inventor: Gilad Armon Kest, Amirim (IL)

(73) Assignee: KENSHOO LTD., Tel Aviv (IL)

( * ) Notice: Subject to any disclaimer, the term of this patent is extended or adjusted under 35 U.S.C. 154(b) by 641 days.

(21) Appl. No.: 15/042,607

(22) Filed: Feb. 12, 2016

(65) Prior Publication Data

US 2016/0239863 A1  Aug. 18, 2016

Related U.S. Application Data

(60) Provisional application No. 62/115,333, filed on Feb. 12, 2015.

(51) Int. Cl.
*G06Q 30/02* (2012.01)
*H04L 29/06* (2006.01)

(52) U.S. Cl.
CPC ..... *G06Q 30/0248* (2013.01); *H04L 63/1491* (2013.01); *H04L 63/14* (2013.01); *H04L 63/1441* (2013.01)

(58) Field of Classification Search
CPC ...... G06Q 30/0248; H04L 63/14–1425; H04L 2463/144; H04L 63/1491; H04L 63/1441
See application file for complete search history.

(56) References Cited

U.S. PATENT DOCUMENTS

| | | | |
|---|---|---|---|
| 8,903,986 B1* | 12/2014 | Newstadt | H04L 63/1425 709/217 |
| 9,898,755 B2* | 2/2018 | McLaughlin | G06F 21/32 |
| 2006/0265493 A1* | 11/2006 | Brindley | G06Q 30/02 709/224 |
| 2007/0078983 A1* | 4/2007 | Modrall | G06F 21/62 709/226 |
| 2008/0281606 A1* | 11/2008 | Kitts | G06Q 30/02 705/1.1 |
| 2008/0288976 A1* | 11/2008 | Carson | G06Q 30/0241 725/34 |

(Continued)

OTHER PUBLICATIONS

CS312 Lecture 21 Hash Functions. Computer Science Department Cornell University. Archived on Nov. 19, 2011. [Retrieved on Aug. 5, 2018]. Retrieved from Internet Archive: <URL: https://web.archive.org/web/20111119031405/http://www.cs.cornell.edu/courses/cs312/2008sp/lectures/lec21.html> (Year: 2011).*

(Continued)

*Primary Examiner* — Michael W Schmucker
*Assistant Examiner* — Bion A Shelden
(74) *Attorney, Agent, or Firm* — The Roy Gross Law Firm, LLC; Roy Gross

(57) ABSTRACT

A method for identifying software robot activity in a communication network, the method comprising: receiving ad delivery requests from multiple clients identified by a unique identifier; selecting a subset of clients from the multiple clients, based on a result of a mathematical operation applied to a character string in each of the unique identifiers; delivering ads only to the subset of clients, wherein each of the ads comprises a landing page URL (uniform resource locator); determining that landing page redirection requests which are received from clients not belonging to the subset are made by one or more software robots.

15 Claims, 5 Drawing Sheets

(56) References Cited

U.S. PATENT DOCUMENTS

| | | | | |
|---|---|---|---|---|
| 2010/0070620 A1* | 3/2010 | Awadallah | ........... | G06F 11/3485 |
| | | | | 709/224 |
| 2011/0082768 A1* | 4/2011 | Eisen | ................. | G06O 30/0609 |
| | | | | 705/26.35 |
| 2012/0090030 A1* | 4/2012 | Rapaport | ............ | H04L 63/1441 |
| | | | | 726/23 |
| 2013/0346202 A1* | 12/2013 | Kouladjie | ............... | G06Q 30/06 |
| | | | | 705/14.55 |
| 2015/0350213 A1* | 12/2015 | Varadarajan | ............ | H04L 63/10 |
| | | | | 713/189 |

OTHER PUBLICATIONS

M. Feily et al. "A Survey of Botnet and Botnet Detection". 2009 Third International Conference on Emerging Security Information, Systems and Technologies. Jun. 18-23, 2009. Retrieved from IEEE Explore on Mar. 27, 2019. <URL: https://ieeexplore.ieee.org/document/5210988> (Year: 2009).*

T. Sardar et al. "Detection and confirmation of web robot requests for cleaning the voluminous web log data". 2014 International Conference on the IMpact of E-Technology on US. Jan. 10-11, 2014. Retrieved from IEEE Explore on Mar. 27, 2019. <URL: https://ieeexplore.ieee.org/document/6775871> (Year: 2014).*

\* cited by examiner

IDENTIFICATION OF SOFTWARE ROBOT ACTIVITY

CROSS REFERENCE TO RELATED APPLICATIONS

This application claims priority from U.S. Provisional Patent Application No. 62/115,333, filed Feb. 12, 2015, entitled "IDENTIFICATION OF SOFTWARE ROBOT ACTIVITY".

FIELD OF THE INVENTION

Present embodiments relate to the field of networking.

BACKGROUND

Recently, interactive media over computer networks has become popular. For example, as the number of people using the Internet has exploded, content providers have come to appreciate media and services offered over the Internet as a potentially powerful way to access end users.

Interactive media provides opportunities for content providers to target their content to a receptive audience. That is, targeted contents are more likely to be useful to end users since the content may be relevant to a need inferred from some user activity (e.g., relevant to a user's search query to a search engine, relevant to content in a document requested by the user, etc.). Query keyword targeting has been used by search engines to deliver relevant content.

End users are spending an ever-increasing amount of time online, looking for information and/or content. The information, provided by Internet content providers, is viewed on a page-by-page basis. Each page can contain written and graphical information as well as one or more links, advertisements, and/or the like. Key advantages of the Internet, relative to other information media, are that each page can be customized to fit a customer profile and may contain links to other Internet pages. Thus, content can be directly targeted at different customer segments. For example, content targeting is nowadays possible based on the geographic location of the provider and/or the customer, the past navigation path of the customer outside or within the web site, the language used by the visitor's web browser, the purchase history on a website, the behavioral intent influenced by the user's action on the site, and more.

The content providers can record end user accesses to the content, clicking of links in the content, and/or the like to further report on the targeting efficiency. In this context, software robots, viruses, internet crawlers, and/or the like can mimic the end user's actions both in selecting content and in further clicking on links within the content.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for identifying software robots. The method comprises using one or more hardware processor for receiving a two or more advertisement requests, each from one of two or more first web clients. The method comprises using one or more hardware processor for determining for each of the advertisement requests an associated ad client identifier for each of the first web clients. The method comprises using one or more hardware processor for sending an advertisement in response to some of the advertisement requests. The method comprises using one or more hardware processor for receiving two or more redirection requests, each from one of two or more second web clients. The method comprises using one or more hardware processor for determining for each of the redirection requests an associated redirection client identifier corresponding to respective the second web client. The method comprises using one or more hardware processor for comparing the ad client identifiers with the redirection client identifiers, to determine a subset of the redirection requests that are not associated with any of the ad client identifiers. The method comprises using one or more hardware processor for storing the redirection client identifiers of the subset as software robot identifiers.

In some embodiments, the identifiers are cookies.

In some embodiments, the method further comprises composing an internet resource report which is devoid of information associated with activity of the software robot identifiers.

In some embodiments, the identifiers are values computed from one or more cookie attributes.

In some embodiments, some of the advertisement requests are determined by a modulo operation applied to the ad client identifier, and the comparing is done by the module operation.

In some embodiments, the method further comprises applying the software robot identifiers to determine when a new web client is operated by a software robot prior to sending an internet resource offer to the new web client.

There is provided, in accordance with an embodiment, a method for identifying software robot activity in a communication network, the method comprising using one or more hardware processor for: receiving ad delivery requests from multiple clients identified at least by cookies or by another unique identifier; selecting a subset of clients from the multiple clients, based on a result of a mathematical operation applied to a character string in each of the cookies; delivering ads only to the subset of clients, wherein each of the ads comprises a landing page URL (uniform resource locator); and determining that landing page redirection requests which are received from clients not belonging to the subset are made by one or more software robots.

In some embodiments, the method further comprises composing an advertising performance report which is devoid of information associated with activity of the one or more software robots.

In some embodiments, the character string is a value of a "cookie-value" attribute.

In some embodiments, the mathematical operation is a modulo operation applied to the cookie-value.

In some embodiments, the method further comprises: collecting information from the landing page redirection requests made by the one or more software robots; and using the information as labeled training data in a supervised machine learning task, to infer a software robot detection function.

In some embodiments, the method further comprises applying the software robot detection function to new landing page redirection requests, thereby mapping the new landing page redirection requests to software robot activity and to human activity.

There is provided, in accordance with an embodiment, a method for identifying software robot activity in a communication network, the method comprising using one or more hardware processor for: receiving ad delivery requests and landing page redirection requests from multiple clients; and determining that those of the multiple clients that transmitted only landing page redirection requests are software robots.

In some embodiments, the unique identifier is a cookie.

In some embodiments, the method further comprises composing an internet resource report which is devoid of information associated with activity of the one or more software robots.

In some embodiments, the unique identifier is a value computed from one or more cookie attributes.

In some embodiments, the authorization criterion is a modulo operation applied to the unique identifier.

In some embodiments, the method further comprises analyzing the subset and the unique identifiers infer a software robot detection criterion.

There is provided, in accordance with an embodiment, a computerized system for identifying software robots. The system comprises one or more hardware processor for executing program code, stored on a non-volatile storage medium. The program code is configured for receiving two or more advertisement requests, each from one of two or more first web clients. The program code is configured for determining for each of the advertisement requests an associated ad client identifier for each of the first web clients. The program code is configured for sending an advertisement in response to some of the advertisement requests. The program code is configured for receiving two or more redirection requests, each from one of two or more second web clients. The program code is configured for determining for each of the redirection requests an associated redirection client identifier for each of the second web clients. The program code is configured for comparing the ad client identifiers with the redirection client identifiers, to determine a subset of the redirection requests that are not associated with any of the ad client identifiers. The program code is configured for storing the redirection client identifiers of the subset as software robot identifiers. The program code is configured for a non-volatile storage medium for storing the program code and the software robot identifiers.

There is provided, in accordance with an embodiment, a computer program product for identifying software robots. The computer program product comprises a non-transitory computer-readable storage medium having program code embodied therewith. The program code is executable by one or more hardware processor for receiving two or more advertisement requests, each from one of two or more first web clients. The program code is executable for determining for each of the advertisement requests an associated ad client identifier corresponding to respective first web client. The program code is executable sending an advertisement in response to some of the advertisement requests. The program code is executable receiving two or more redirection requests, each from one of two or more second web clients. The program code is executable determining for each of the redirection requests an associated redirection client identifier corresponding to respective second web client. The program code is executable comparing the ad client identifiers with the redirection client identifiers, to determine a subset of the redirection requests that are not associated with any of the ad client identifiers. The program code is executable storing the client identifiers of the subset as software robot identifiers. The program code is executable a non-volatile storage medium for storing the program code and the software robot identifiers. In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Glossary

Figure 1:
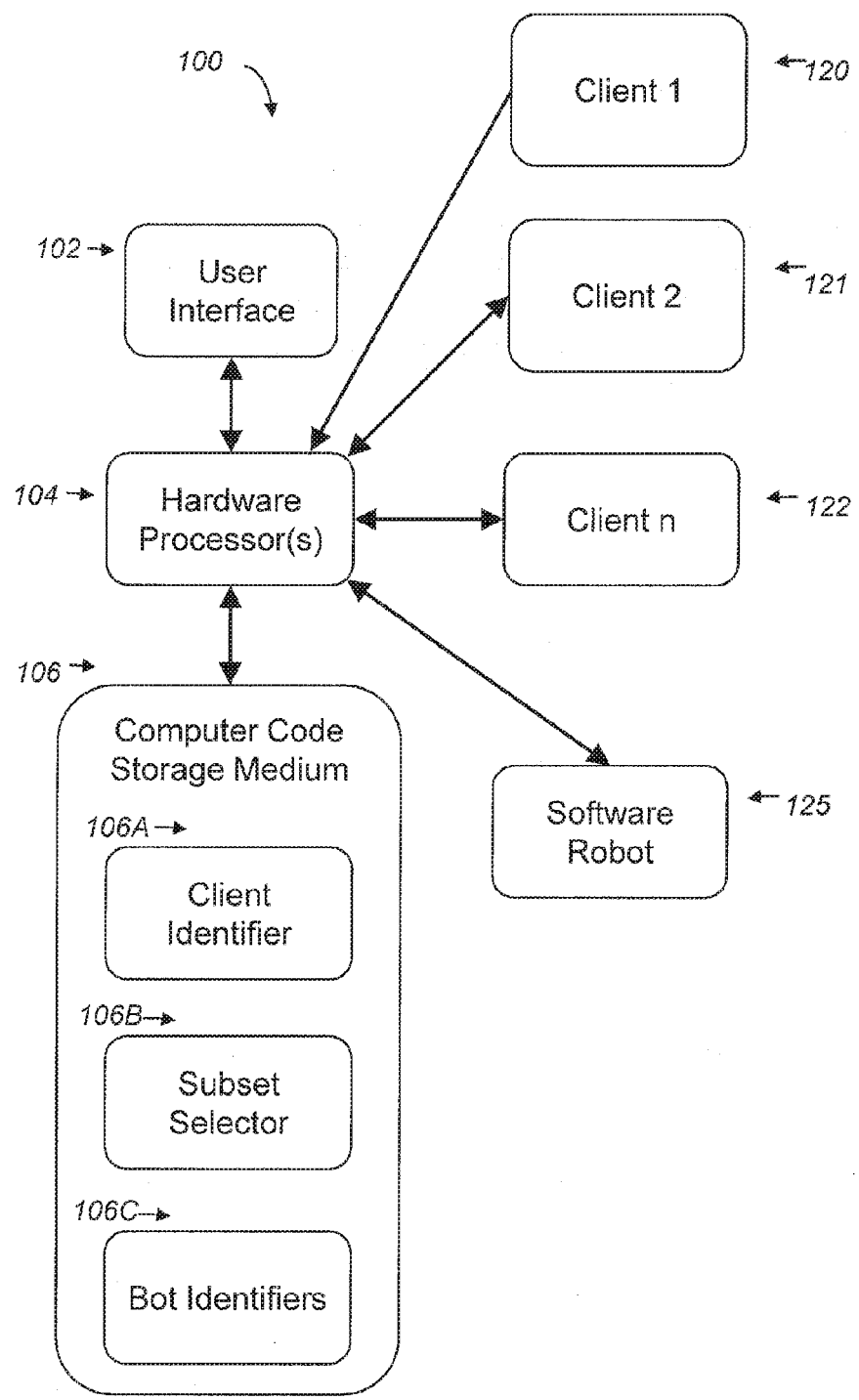
FIG. 1 shows a schematic illustration of a system for identifying software robots.

"Online advertising platform" (or simply "advertising platform"): This term, as referred to herein, may relate to a service offered by an advertising business to different advertisers. In the course of this service, the advertising business serves ads, on behalf of the advertisers, to Internet users. Each advertising platform usually services a large number of advertisers, who compete on advertising resources available through the platform. The competition is oftentimes carried out by conducting some form of an auction, where advertisers bid on advertising resources. The ads may be displayed (and/or otherwise presented) in various web sites which are affiliated with the advertising business (these web sites constituting what is often referred to as a "display network") and/or in one or more web sites operated directly by the advertising business. To aid advertisers in neatly organizing their ads, advertising platforms often allow grouping individual ads in sets, such as the "AdGroups" feature in Google AdWords (a service operated by Google, Inc. of Mountain View, Calif.). The advertiser may decide on the logic behind such grouping, but it is common to have ads grouped by similar ad copies, similar targeting, etc. Advertising platforms may allow an even more abstract way to group ads; this is often called a "campaign". A campaign usually includes multiple sets of ads, with each set including multiple ads. An advertiser may control the cost it spends on online advertising by assigning a budget per individual ad, a group of ads or the like. The budget may be defined for a certain period of time.

"Search advertising platform": A type of advertising platform in which ads are served to Internet users responsive to search engine queries executed by the users. The ads are typically displayed alongside the results of the search engine query. AdWords is a prominent example of a search advertising platform. In AdWords, advertisers can choose between displaying their ads in a display network and/or in Google's own search engine; the former involves the subscription of web site operators (often called "publishers") to Google's AdSense program, whereas the latter, often referred to as SEM (Search Engine Marketing), involves triggering the displaying of ads based on keywords entered by users in the search engine.

"Social advertising platform": A further type of advertising platforms, commonly referred to as a "social" advertising platform, involves the displaying of ads to users of online social networks. An online social network is often defined as a set of dyadic connections between persons and/or organizations, enabling these entities to communicate over the Internet. In social advertising, both the advertisers and the users enjoy the fact that the displayed ads can be highly tailored to the users viewing them. This feature is enabled by way of analyzing various demographics and/or other parameters of the users (jointly referred to as "targeting criteria")—parameters which are readily available in many advertising platforms of social networks and are usually provided by the users themselves. Facebook Ads, operated by Facebook, Inc. of Menlo Park, Calif., is such an advertising platform. LinkedIn Ads, by LinkedIn Corporation of Mountain View, Calif., is another.

"Online ad entity" (or simply "ad entity"): This term, as referred to herein, may relate to an individual ad, or, alternatively, to a set of individual ads, run by an advertising platform. An individual ad, as referred to herein, may include an ad copy, which is the text, graphics and/or other media to be served (displayed and/or otherwise presented) to users. The ad copy may also include a link, in URL (Uniform Resource Locator) format, to a landing page. The term "landing page" refers to a web page, commonly in HTML (HyperText Markup Language) format. In addition, an individual ad may include and/or be associated with a set of parameters, such as searched keywords to target, geographies to target, demographics to target, a bid for utilization of advertising resources of the advertising platform, and/or the like. Sometimes, the bid may set for a particular parameter instead of or in addition to setting a global bid for the ad entity; for example, a bid may be per keyword, geography, etc.

"Reach": the number of users which fit certain targeting criteria of an ad entity. This is the number of users to which that ad entity can be potentially displayed. The "reach" metric is common in social advertising platforms, such as Facebook.

"Search volume": the number of average monthly searches (or searches over another period of time) for a certain search term. The search volume is often provided by search advertising platforms, such as Google AdWords.

"Performance": This term, as referred to herein with regard to an ad, may relate to various statistics gathered in the course of running the ad. A "running" phase of the ad may refer to a duration in which the ad was served to users, or at least to a duration during which the advertiser defined that the ad should be served. The term "performance" may also relate to an aggregate of various statistics gathered for a set of ads, a campaign, etc. The statistics may include multiple parameters (also "performance metrics"). Exemplary performance metrics are:

"Impressions": the number of times the ad has been served to users during a given time period (e.g. a day, an hour, etc.);

"Frequency": the average number of times a user has been exposed to the same ad, calculated as the ratio of total number of impressions to the number of unique impressions (i.e. the number of unique users exposed to that ad). This metric is very common in social advertising platforms;

"Clicks": the number of times users clicked (or otherwise interacted with) the ad entity during a given time period (e.g. a day, an hour, etc.);

"Cost per click (CPC)": the average cost of a click (or another interaction with an ad entity) to the advertiser, calculated as the total cost for all clicks divided by the number of clicks;

"Cost per impression": the average cost of an impression to the advertiser, calculated as the total cost for all impressions divided by the number of impressions;

"Click-through rate (CTR)": the ratio between clicks and impressions of the ad entity, namely—the number of clicks divided by the number of impressions;

"Conversions": the number of times in which users who clicked (or otherwise interacted with) the ad entity has consecutively accepted an offer made by the advertiser during a given time period (e.g. a day, an hour, etc.). For examples, users who purchased an advertised product, users who subscribed to an advertised service, users who downloaded a mobile application, or users who filled in their details in a lead generation form;

"Conversion rate (CR)": the total number of conversions divided by the total number of clicks;

"Return on investment (ROI)" or "Return on advertising spending (ROAS)": the ratio between the amount of revenue generated as a result of online advertising, and the amount of investment in those online advertising efforts. Namely—revenue divided by expenses;

"Revenue per click": the average amount of revenue generated to the advertiser per click (or another interaction with an ad entity), calculated by dividing total revenue by total clicks;

"Revenue per impression": the average amount of revenue generated to the advertiser per impression of the ad entity, calculated by dividing total revenue by total impressions;

"Revenue per conversion": the average amount of revenue generated to the advertiser per conversion, calculated by dividing total revenue by total conversions;

"Unique-impressions-to-reach ratio": the ratio between the number of unique impressions (i.e. impressions by different users, ignoring repeated impressions by the same user) and the reach of the ad entity. This ratio represents the realized portion of the reach.

"Spend rate": the percentage of utilized budget per a certain time period (e.g. a day) for which the budget was defined. In many scenarios, even if an advertiser assigns a certain budget for a certain period of time, not the entire budget is consumed during that period. The spend rate metric measures this phenomenon.

"Quality score": a score often provided by advertising platforms for each ad entity. For example, Google AdWords assigns a quality score between 1 and 10 to each individual ad. Factors which determine the quality score include, for example, CTR, ad copy relevance, landing page quality and/or other factors. The quality score, together with the bids placed by the advertiser, are usually the factors which affect the results of the competition between different advertisers on advertising resources.

"Potential reach": defined as 1 minus the unique-impressions-to-reach ratio. The higher the potential reach, the more users are left to display the ad entity to.

"Proportional performance metrics": those of the above performance metrics (or other performance metrics not discussed here) which denote a proportion between two performance metrics which are absolute values. Merely as one example, CTR is a proportional performance metric since it denotes the proportion between clicks (an absolute value) and impressions (another absolute value). As an alternative, a proportional performance metric may be a proportion between an absolute performance metric and another parameter, such as time. As yet another alternative, a proportional performance metric may be a certain mathematic manipulation of a proportion between two absolute performance metrics; the "potential reach" is an example, since it is defined as 1 minus the unique-impressions-to-reach ratio.

"HTTP Cookie" (or simply "cookie"): As defined in A. Barth, "HTTP State Management Mechanism", IETF, RFC 6265, April 2011. [Online]. Available at: http://tools.ietf.org/html/rfc6265. This RFC is incorporated herein by reference in its entirety.

"Software robot" (sometimes referred to as a "bot", "Internet bot", "web robot" or the like): A software application that carries out automated tasks over a communication network such as the Internet. The software robot may operate on a computing device connected to the pertinent network. It may perform tasks that are both simple and structurally repetitive, at a much higher rate than would be possible for a human alone. Software robots are oftentimes programmed to pose as regular web clients (i.e. web browsers), and to that end they transmit and receive information using a suitable protocol, such as HTTP (HyperText Transfer Protocol). Also, they often have the capability to store and transmit cookies.

"Web Browser": a software application running on a client terminal that is used by a user to access internet resources.

"Web Client": any type of application that can request internet resources, advertisements, redirection requests, and/or the like from a server. For example, a software robot, a web browser, a second server, and/or the like may be considered web clients.

Embodiments

Disclosed herein is a method for identifying software robot activity in a communication network, which method enables differentiation between human activity and software robot activity in the communication network.

The method may be particularly useful in the online advertising field, where there is great importance to the reliability of statistical data pertaining to online advertising campaigns. Namely, an advertiser can greatly benefit from performance reports which are not biased due to activity of software robots in association with ads. Unfortunately, such activity is quite common; both the advertising platforms themselves and third parties employ software robots which conduct activity influencing the performance reports. For example, these software robots may be used by the advertising platforms to crawl landing pages to which the ads redirect. If these crawls are recorded in the reports as simple landing page visits, the advertiser may draw the wrong occlusions from reviewing the reports.

Another advantage of the present method is a reduction in the amount of performance data that needs to be stored and analyzed, thereby saving computing and storage resources.

The present method lays an intelligent trap for these software robots. The trap may be based on the notion that humans who reach an advertiser's landing page must have reached it by clicking on a link displayed in an ad served to these humans. Software robots, on the other hand, such as those orchestrated by the advertising platform, may have the ability to reach the landing page without having been served the ad previously; that is, the advertising platform may be aware of the landing page's URL from its own internal records.

Therefore, the laying of the trap may include the following steps, implemented as software running on a computerized server connected to a communication network:

First, ad delivery requests may be received from multiple clients whose identity as software robots or as human-operated clients is unknown at this stage. The requests are optionally HTTP requests to receive ad copy which comprises a landing page URL. The server may receive a unique identifier (e.g. a cookie) from each of these clients, wherein the unique identifier includes one or more unique character string, for example a value of a "cookie-value" attribute. This unique character string allows uniquely identifying each of the clients.

Another example of a unique identifier is the Identifier for Advertising (IDFA or IFA), an identification mechanism for mobile devices introduced by Apple, Inc. with its iOS 6, but now in use by other vendors. The IDFA is an alphanumeric string unique to each device, which the device transmits to remote servers for the purpose of identifying the device when serving it with ads, selling products or services to the device's user, etc.

A further example of a unique identifier is a fingerprint which is a collection of data gathered from a client user's web browser. While this collection of data is not absolutely unique, it can serve to identify a browser and/or client with a great degree of confidence. As disclosed in the Panopticlick research project by the Electronic Frontier Foundation, combining browser data such as user-agent, HTTP_ACCEPTHeaders, browser plugin details, time zone, screen size, screen color depth, system fonts and cookie status (enabled/disabled)—all easily gatherable through HTTP queries—can yield a quite solid identification of a certain web browser and/or client. See Electronic Frontier Foundation, "Panopticlick: How Unique—and Trackable—Is Your Brower?", available online at http://panopticlick.eff.org, last viewed Feb. 11, 2015.

Those of skill in the art will recognize further means for uniquely or almost uniquely identifying a certain web browser, client, and/or a computing device.

Second, a subset of the clients from the multiple clients may be selected, based on a result of a mathematical operation applied to the character string. For example, if the character string is a number, a modulo operation may be applied to it, and all clients having the same, predetermined modulo result, may be defined as belonging to the subset. Assume, for instance, that a modulo 2 operation is applied; this will divide the clients into two groups—one having a result of 0 and the other having a result of 1. One of these groups may be selected as the subset.

Third, ads may be delivered only to the subset of clients, whereas the remaining clients will not receive ads in response to their requests, or, at the very least, will receive ads without a landing page URL.

Fourth, landing page redirection requests may be received. Any such landing page redirection request which is received from clients not belonging to the subset, may be determined to be made by a software robot. Namely, such a request could not have been the result of a human receiving an ad and clicking on landing page URL in the ad copy—since clients not belonging to the subset simply did not receive any ads.

In practice, the above four steps may be performed on a client-by-client basis. Namely, for each individual client request, it may be determined whether that client belongs to the subset, and consequently whether an ad should be delivered to it, and whether it is a software robot.

It should be stressed that this trap cannot tell whether a landing page redirection request received from clients outside of the subset is made by a software robot or a human. In order to trap software robots which are not part of the subset, it is necessary to repeat the process, with a different attribution of clients to the subset in each repetition. The frequency of such repetition, as well as the size of the subset compared to the entire number of the clients, will influence the statistical probability that software robots can be caught by the trap, and will impact efficiency of the process.

After the trap has identified software robots, it is possible to compose an advertising performance report, as known in the art, which is devoid of information associated with activity of the one or more software robots. For example, all impressions and clicks made by the software robots, as identified by their cookies, may be omitted from such report.

Furthermore, after the trap has been active for some time, it may be possible to use information collected from landing page redirection requests made by the software robots in order to infer a detection function capable of detecting software robots by their behavior, at a high level of reliability. Namely, while the trap is active, information such as cookies of the software robots, their user-agent strings, their referrers, their IP (Internet Protocol) addresses, their geographic location, the time stamp of the requests, etc.—may be used as labeled training data in a supervised machine learning task. A suitable machine learning algorithm, as known in the art, may process this labeled training data, to infer a software robot detection function. Then, identification of new robots may be done by operating a classifier, as known in the art, which applies the software robot detection function to new requests—thereby classifying (also "mapping") them as software robots or humans.

In the present description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in one or more embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As will be appreciated by one skilled in the art, aspects of the present invention may be embodied as a system, method, apparatus or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
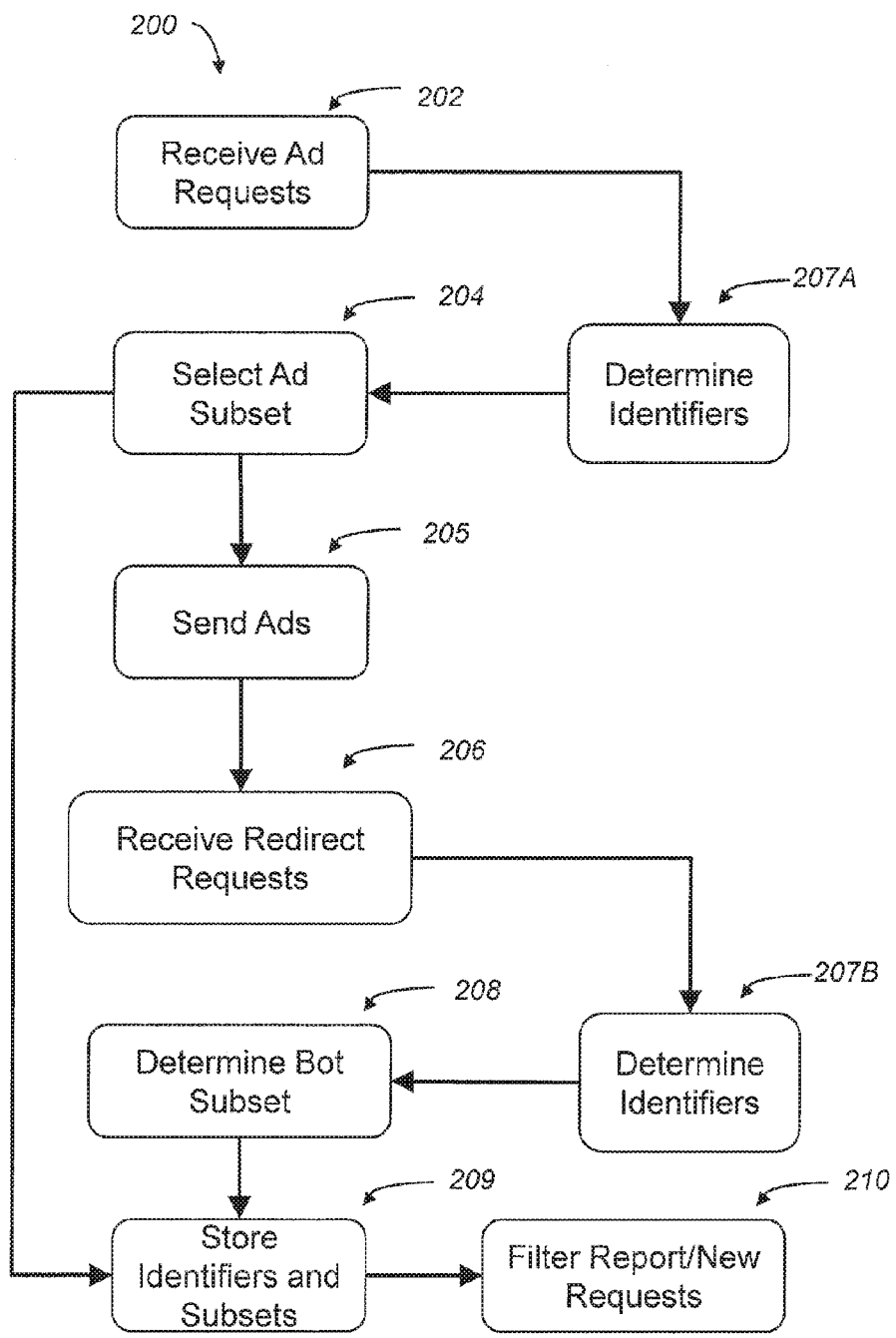
FIG. 2 shows a flowchart of a method for identifying software robots.

Reference is now made to FIG. 1 and FIG. 2, which are a schematic illustration of a system 100 and a flowchart of a method 200 respectively, for identifying software robots. System 100 comprises a user interface 102, one or more hardware processor 104, and a storage medium 106 for program code. Hardware processor(s) 104 using a network interface (not shown), receives 202 requests for advertisements from web browsers (120, 121, and 122) and software robots (125 for example), referred to herein as ad clients, according to instructions stored in medium 106 as Client Identifier 106A program code. Hardware processor(s) 104 determines 207A for each ad request a unique identifier, such as a client identifier, a client terminal identifier, a cookie, a combination of cookies, and the like, associated with the browser or robot, according to instructions stored in medium 106 as Client Identifier 106A program code. Hardware processor(s) 104 may not know at this stage which of the ad requests is associated with browser(s) (120, 121, and 122) and which with software robot, such as 125. Hardware processor(s) 104 selects 204 a subset of ad requests and sends 205 ads to these clients, according to instructions stored in medium 106 as Subset Selector 106B program code. The ad request client identifiers and subset of them that are sent ads are stored 209 on storage medium 106.

Hardware processor(s) 104 using a network interface (not shown), receives 206 redirection requests, according to instructions stored in medium 106 as Bot Identifier 106C program code. Hardware processor(s) 104 determines 207B for each redirection request a unique identifier, such as a client identifier, a client terminal identifier, a cookie, a combination of cookies, and the like, associated with the redirection request, according to instructions stored in medium 106 as Bot Identifier 106C program code. Hardware processor(s) 104 compares the ad request identifiers with the redirection request identifiers, and determines 208 a subset of the redirection identifiers that are received from software robots, according to instructions stored in medium 106 as Bot Identifier 106C program code. The bot identifiers are stored 209 on storage medium 106, and used by hardware processor(s) 104 to filter 210 the ad requests, redirection requests, conversions, and/or the like from reports, according to instructions stored in medium 106 as Bot Identifier 106C program code. The bot identifiers may be used to filter 210 new requests for advertisements and/or redirection.

Figure 3:
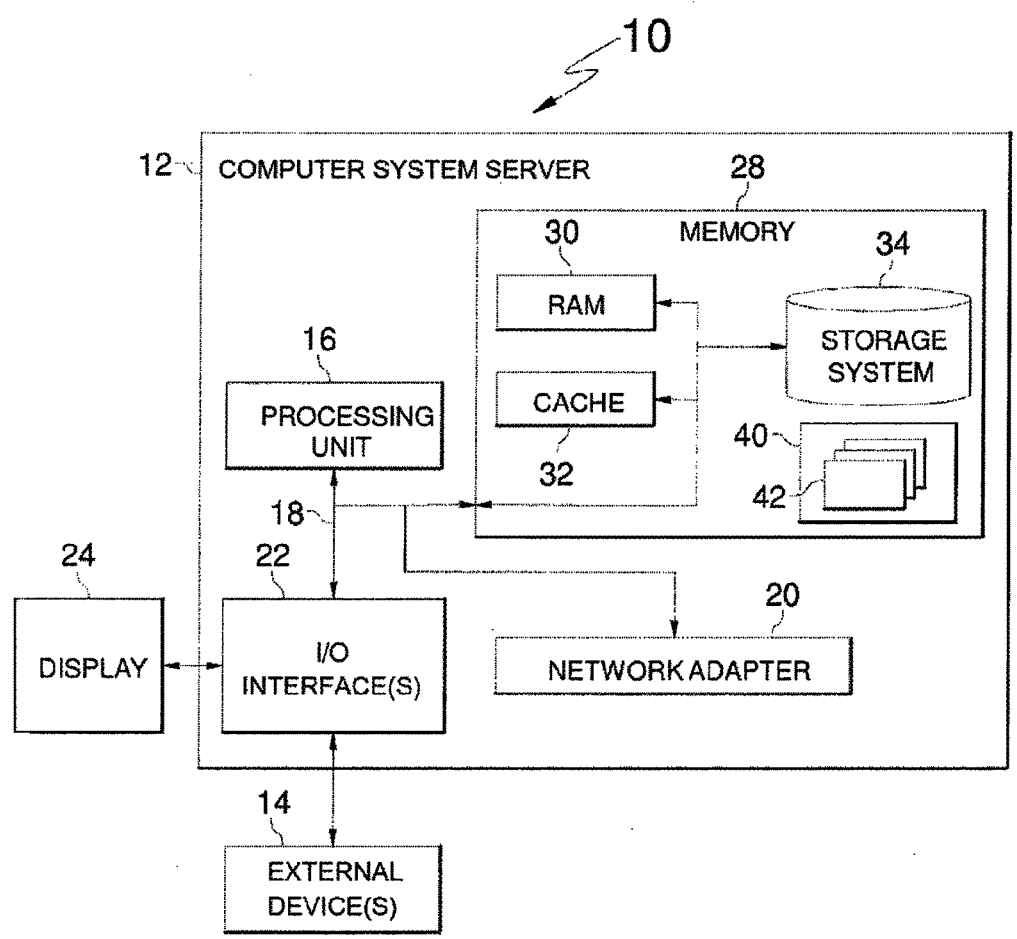
FIG. 3 shows a schematic of an example of a cloud computing node.

Following are embodiments related to computer server(s), cloud computing, and software as a service. Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system.

Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that connects various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include one or more program product having a set (e.g., at least one) of program modules that are configured to carry out the functions of embodiments of the invention.

Program/utility 40, having a set (one or more) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
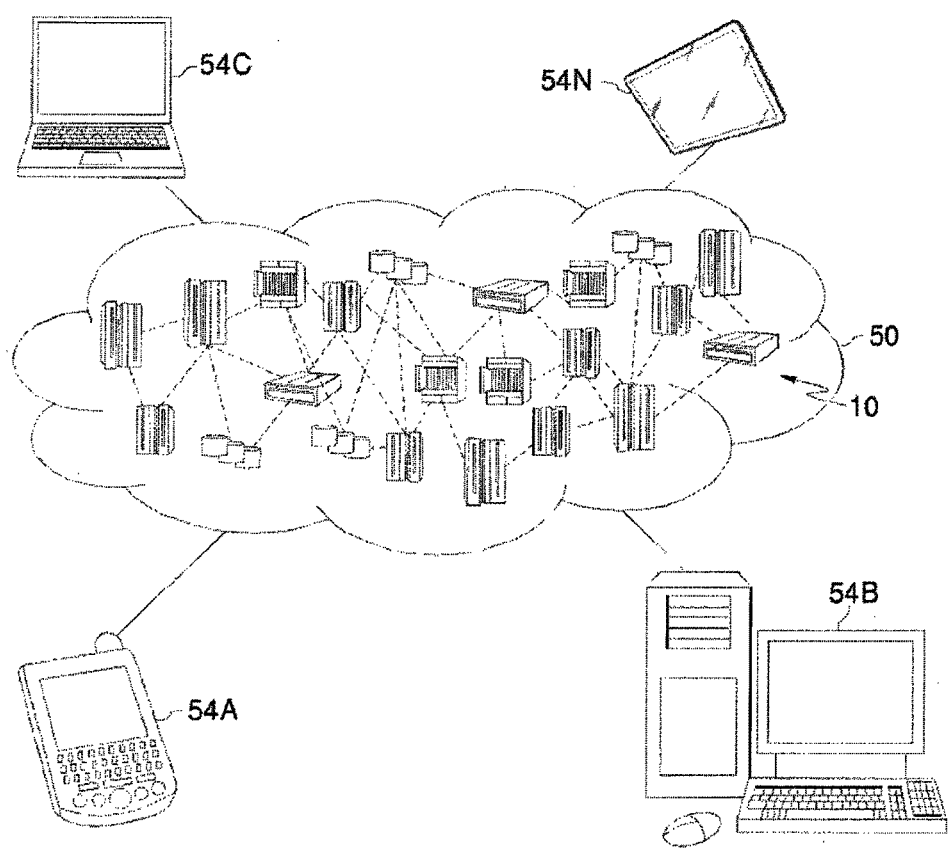
FIG. 4 shows an illustrative cloud computing environment.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or tablet computing device 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
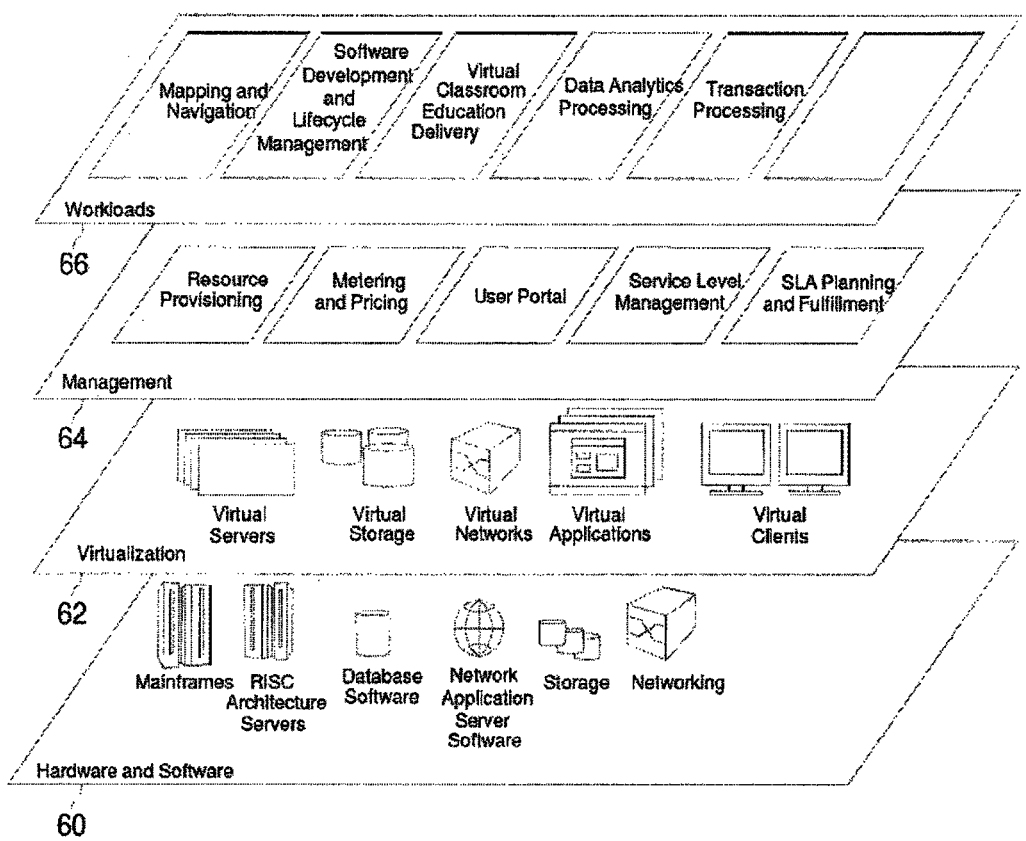
FIG. 5 shows a set of functional abstraction layers provided by the cloud computing environment of FIG. 4.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes, RISC (Reduced Instruction Set Computer) architecture based servers; storage devices; networks and networking components. Examples of software components include network application server software; and database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; and data analytics processing; transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for identifying software robots, the method comprising using at least one hardware processor for, automatically:
   (a) receiving a plurality of advertisement requests, each from one of a plurality of first-web clients, wherein:
      each of the plurality of advertisement requests is a request by the respective web client to receive ad copy which comprises a landing page URL (Uniform Resource Locator), and
      an identity of the web clients as software robots or human-operated clients is unknown as of the time of said receiving;
   (b) determining, for each of said plurality of advertisement requests, an ad client identifier for each of the web clients, wherein the ad client identifier uniquely identifies the respective web client in more than a single instance of serving an advertisement in response to the respective advertisement request;
   (c) dividing the web clients, based on their ad client identifiers, into two groups: a first group and a second group;
   (d) for the first group: sending an advertisement to each web client of the first group, in response to the respective advertisement requests from the web clients of the first group, wherein the sent advertisement comprises the ad copy with the landing page URL;
   (e) for the second group:
      not sending an advertisement to each web client of the second group, thereby ignoring the respective advertisement requests from the web clients of the second group, or
      sending a partial advertisement to each web client of the second group, in response to the respective advertisement requests from the web clients of the second group, wherein the sent partial advertisement comprises ad copy without the landing page URL;
   (f) receiving a plurality of redirection requests from web clients of both the first group and the second group, wherein the redirection requests are to the landing page URL;

(g) determining, for each of the redirection requests, the respective ad client identifier for each of the web clients which sent the redirection requests;

(h) locating one or more ad client identifiers of the web clients of the second group among the ad client identifiers determined in step (g), to determine that the located ad client identifiers are of software robots and not of human-operated clients;

(i) storing the located ad client identifiers as software robot identifiers, and (j) applying the software robot identifiers to determine when a new web client is operated by a software robot prior to sending a new advertisement to said new web client.

2. The method according to claim 1, wherein at least some of the ad client identifiers are cookies.

3. The method according to claim 1, further comprising composing an Internet resource report which is devoid of information associated with activity of the software robot identifiers.

4. The method according to claim 1, wherein at least some of the ad client identifiers are values computed from one or more cookie attributes.

5. The method according to claim 1, wherein said division of the web clients into the first and second groups is by a modulo operation applied to each respective ad client identifier, wherein the modulo operation produces two different results.

6. A system comprising:
at least one hardware processor; and
a non-transitory computer-readable storage medium having program code embodied therewith, the program code executable by said at least one hardware processor for, automatically:

(a) receiving a plurality of advertisement requests, each from one of a plurality of web clients, wherein:
each of the plurality of advertisement requests is a request by the respective web client to receive ad copy which comprises a landing page URL (Uniform Resource Locator), and
an identity of the web clients as software robots or human-operated clients is unknown as of the time of said receiving;

(b) determining, for each of said plurality of advertisement requests, an ad client identifier for each of the web clients, wherein the ad client identifier uniquely identifies
the respective web client in more than a single instance of serving an advertisement in response to the respective advertisement request;

(c) dividing the web clients, based on their ad client identifiers, into two groups; a first group and a second group;

(d) for the first group: sending an advertisement to each web client of the first group, in response to the respective advertisement requests from the web clients of the first group, wherein the sent advertisement comprises the ad copy with the landing page URL;

(e) for the second group:
not sending an advertisement to each web client of the second group, thereby ignoring the respective advertisement requests from the web clients of the second group, or
sending a partial advertisement to each web client of the second group, in response to the respective advertisement requests from the web clients of the second group, wherein the sent partial advertisement comprises ad copy without the landing page URL;

(f) receiving a plurality of redirection requests from web clients of both the first group and the second group, wherein the redirection requests are to the landing page URL;

(g) determining, for each of the redirection requests, the respective ad client identifier for each of the web clients which sent the redirection requests;

(h) locating one or more ad client identifiers of the web clients of the second group among the ad client identifiers determined in step (g), to determine that the located ad client identifiers are of software robots and not of human-operated clients;

(i) storing the located ad client identifiers as software robot identifiers, and (j) applying the software robot identifiers to determine when a new web client is operated by a software robot prior to sending a new advertisement to said new web client.

7. The system according to claim 6, wherein at least some of the ad client identifiers are cookies.

8. The system according to claim 6, wherein the program code is further executable by said at least one hardware processor for, automatically, composing an internet resource report which is devoid of information associated with activity of the software robot identifiers.

9. The system according to claim 6, wherein at least some of the ad client identifiers are values computed from one or more cookie attributes.

10. The system according to claim 6, wherein said division of the web clients into the first and second groups is by a modulo operation applied to each respective ad client identifier, wherein the modulo operation produces two different results.

11. A computer program product composing a non-transitory computer-readable storage medium having program code embodied therewith, the program code executable by at least one hardware processor for, automatically:

(a) receiving a plurality of advertisement requests, each from one of a plurality of web clients, wherein:
each of the plurality of advertisement requests is a request by the respective web client to receive ad copy which comprises a landing page URL (Uniform Resource Locator), and
an identity of the web clients as software robots or human-operated clients is unknown as of the time of said receiving;

(b) determining, for each of said plurality of advertisement requests, an ad client identifier for each of the web clients, wherein the ad client identifier uniquely identifies the respective web client in more than a single instance of serving an advertisement in response to the respective advertisement request;

(c) dividing the web clients, based on their ad client identifiers, into two groups: a first group and a second group;

(d) for the first group: sending an advertisement to each web client of the first group, in response to the respective advertisement requests from the web clients of the first group, wherein the sent advertisement comprises the ad copy with the landing page URL;

(e) for the second group:
not sending an advertisement to each web client of the second group, thereby ignoring the respective advertisement requests from the web clients of the second group, or sending a partial advertisement to each web client of the second group, in response to the respective advertisement requests from the web clients of the second group, wherein the sent partial advertisement comprises ad copy without the landing page URL;

(f) receiving a plurality of redirection requests from web clients of both the first group and the second group, wherein the redirection requests are to the landing page URL;

(g) determining, for each of the redirection requests, the respective ad client identifier for each of the web clients which sent the redirection requests;

(h) locating one or more ad client identifiers of the web clients of the second group among the ad client identifiers determined in step (g), to determine that the located ad client identifiers are of software robots and not of human-operated clients;

(i) storing the located ad client identifiers as software robot identifiers, and (j) applying the software robot identifiers to determine when a new web client is operated by a software robot prior to sending a new advertisement to said new web client.

12. The system according to claim 11, wherein at least some of the ad client identifiers are cookies.

13. The system according to claim 11, wherein the program code is further executable by said at least one hardware processor for, automatically, composing an internet resource report which is devoid of information associated with activity of the software robot identifiers.

14. The system according to claim 11, wherein at least some of the ad client identifiers are values computed from one or more cookie attributes.

15. The system according to claim 11, wherein said division of the web clients into the first and second groups is by a modulo operation applied to each respective ad client identifier, wherein the modulo operation produces two different results.

* * * * *